United States Patent
Cheng et al.

(10) Patent No.: US 9,557,614 B2
(45) Date of Patent: Jan. 31, 2017

(54) DISPLAY SUBSTRATE, MANUFACTURING METHOD THEREOF AND DISPLAY DEVICE

(71) Applicant: BOE TECHNOLOGY GROUP CO., LTD., Beijing (CN)

(72) Inventors: Hongfei Cheng, Beijing (CN); Jianbo Xian, Beijing (CN); Yong Qiao, Beijing (CN); Yongchun Lu, Beijing (CN); Jian Xu, Beijing (CN); Yongda Ma, Beijing (CN); Wenbo Li, Beijing (CN); Pan Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 16 days.

(21) Appl. No.: 14/771,748

(22) PCT Filed: Apr. 20, 2015

(86) PCT No.: PCT/CN2015/076951
§ 371 (c)(1),
(2) Date: Aug. 31, 2015

(87) PCT Pub. No.: WO2016/062043
PCT Pub. Date: Apr. 28, 2016

(65) Prior Publication Data
US 2016/0299392 A1 Oct. 13, 2016

(30) Foreign Application Priority Data
Oct. 22, 2014 (CN) .................... 2014 2 0615930 U

(51) Int. Cl.
*G02F 1/1343* (2006.01)
*G02F 1/1362* (2006.01)
*G02F 1/1368* (2006.01)

(52) U.S. Cl.
CPC ....... *G02F 1/134336* (2013.01); *G02F 1/1362* (2013.01); *G02F 1/1368* (2013.01);
(Continued)

(58) Field of Classification Search
CPC  G02F 1/134309; G02F 1/136; G02F 1/13624; G02F 1/1368; G02F 1/136286; G02F 1/133345; G02F 1/134336; G02F 1/134363; G02F 1/136213; G02F 1/1362; G02F 1/136227; G02F 1/1333; G02F 1/1343; G02F 1/133; G02F 2001/134345; G02F 2001/134318; G02F 2001/134354; G02F 2001/134372; G02F 2001/13606; H01L 29/78669; H01L 2251/305; H01L 2251/308; G09G 3/3648; G09G 3/3655; G09G 3/3677; G09G 3/3688; G09G 2300/0426
(Continued)

(56) References Cited

U.S. PATENT DOCUMENTS

| 9,057,917 B2 | 6/2015 | Choi et al. |
| 2009/0213286 A1* | 8/2009 | Kim ................ G02F 1/136286 349/39 |
| 2010/0032677 A1 | 2/2010 | Lee et al. |

FOREIGN PATENT DOCUMENTS

| CN | 101441380 A | 5/2009 |
| CN | 101937156 A | 1/2011 |

(Continued)

OTHER PUBLICATIONS

Written Opinion of the International Searching Authority for International Application No. PCT/CN2015/076951.

*Primary Examiner* — Thoi Duong
(74) *Attorney, Agent, or Firm* — Harness, Dickey & Pierce, P.L.C.

(57) ABSTRACT

A display substrate includes a first base substrate; a gate line, a data line and a common electrode line arranged on the first
(Continued)

base substrate; a plurality of pixel units each including a first sub-pixel electrode, a second sub-pixel electrode, a first thin film transistor, a second thin film transistor and a third thin film transistor; and a charge adjustment-control line arranged on the first base substrate, where the charge adjustment-control line and the gate line are between the first sub-pixel electrode and the second sub-pixel electrode. The first thin film transistor is connected to the gate line, the data line and the first sub-pixel electrode; the second thin film transistor is connected to the gate line, the data line and the second sub-pixel electrode; the third thin film transistor is connected to the charge adjustment control line, the first sub-pixel electrode and the common electrode line.

11 Claims, 4 Drawing Sheets

(52) U.S. Cl.
CPC .... *G02F 1/13624* (2013.01); *G02F 1/136213* (2013.01); *G02F 1/136286* (2013.01); *G02F 2001/134318* (2013.01); *G02F 2001/134345* (2013.01); *G02F 2201/121* (2013.01); *G02F 2201/123* (2013.01)

(58) Field of Classification Search
USPC ..... 349/43, 139, 138, 46, 144, 141, 143, 38, 349/41, 48; 257/72, 59, 71; 438/30, 151, 438/23, 158
See application file for complete search history.

(56) References Cited

FOREIGN PATENT DOCUMENTS

| | | |
|---|---|---|
| CN | 102213872 A | 10/2011 |
| CN | 204101858 U | 1/2015 |
| EP | 2275858 A1 | 1/2011 |

* cited by examiner

DISPLAY SUBSTRATE, MANUFACTURING METHOD THEREOF AND DISPLAY DEVICE

CROSS-REFERENCE TO RELATED APPLICATION

The present application is the U.S. national phase of PCT Application No. PCT/CN2015/076951 filed on Apr. 20, 2015, which claims the priority of Chinese patent application No.201420615930.3 filed on Oct. 22, 2014, the disclosure of which is incorporated herein by reference.

TECHNICAL FIELD

The present disclosure relates to the field of display technology, and in particular to a display substrate, a method for manufacturing the same and a display device.

BACKGROUND

The liquid crystal display technology has been widely applied to the fields of television, cell phone and public information display. The liquid crystal display mainly includes a twisted nematic (TN) mode, a vertical-aligned (VA) mode, an in-plane switching (IPS) mode. The liquid crystal of VA mode has a high contrast ratio, where an eight-domain liquid crystal arrangement can be achieved in one pixel, so as to obtain a wide view angle, thereby it has been widely applied in large size liquid crystal display. FIG. 1 is a schematic diagram showing a circuit of a liquid crystal display device according to the related art. As shown in FIG. 1, when a level of a gate line GLn is a high level, a first thin film transistor T1 is turned on, and a data voltage Vdata of a data line DL charges a first storage capacitor CSTa via the first thin film transistor T1. A second thin film transistor T2 is turned on, the data voltage Vdata of the data line DL charges a second liquid crystal capacitor CSTb via the second thin film transistor T2. When a level of a gate line GLn+1 is a high level, a third thin film transistor T3 is turned on, and the first storage capacitor CSTa charges a capacitor Cd, thereby charges Qb in the second storage capacitor CSTb is more than charges Qa in the first storage capacitor CSTa. When the CSTa and the CSTb are configured properly, for example, the capacitances of the CSTa and the CSTb are the same, a voltage Vb of a second sub-pixel electrode PEb is greater than a voltage Va of a first sub-pixel electrode PEa. Generally, the voltage Vb of the second sub-pixel electrode PEb and the voltage Va of the first sub-pixel electrode PEa are required to satisfy: 0.6 Vb<Va<0.9 Vb.

When the first storage capacitor CSTa is charged via the first thin film transistor T1, the second storage capacitor CSTb is charged via the second thin film transistor T2, a gate electrode of the third thin film transistor T3 is connected to a next row of the gate line Gln+1, a source electrode of the third thin film transistor T3 is connected to the first storage capacitor CSTa, a drain electrode of the third thin film transistor T3 is connected to the capacitor Cd, and the first thin film transistor T1, the second thin film transistor T2 and the third thin film transistor T3 are saturated when they are turned on, (Vgs−Vth) of each thin film transistor is greater than Vdata, where Vgs is a voltage difference between the gate and source electrodes of the thin film transistor, and Vth is a threshold voltage of the thin film transistor. In this case, a current of the thin film transistor I is equal to $(1/2)Cox(W/1)(Vgs-Vth)^2$, where Cox is gate capacitance per unit area, W/1 is a width-length ratio of channel. Therefore, when the W/1 is fixed, a charging current is constant. When the storage capacitor CSTa of the first sub-pixel electrode PEa and the storage capacitor CSTb of the second sub-pixel electrode PEb are given, a relationship between the Va and the Vb is fixed, i.e., Vb−Va=c, where c is a constant. For the liquid crystal display device, a view angle of an eight-domain liquid crystal display device is related to a liquid crystal material, a pixel structure, a shape of the pixel electrode and a driving method. A fixed (Vb−Va) may be obtained when the first sub-pixel electrode and second sub-pixel electrode are controlled by two adjacent gate lines, however, it is difficult for the liquid crystal display device to obtain a better display view angle due to the fixed (Vb−Va).

SUMMARY

The present disclosure is to provide a display panel, a method for manufacturing the same and a display device, which may obtain a better display view angle.

A display substrate is provided, including a first base substrate; a gate line, a data line and a common electrode line arranged on the first base substrate; a plurality of pixel units; wherein each of the plurality of pixel units includes a first sub-pixel electrode, a second sub-pixel electrode, a first thin film transistor, a second thin film transistor and a third thin film transistor; and a charge adjustment-control line arranged on the first base substrate; wherein the charge adjustment-control line and the gate line are arranged between the first sub-pixel electrode and the second sub-pixel electrode. The first thin film transistor is connected to the gate line, the data line and the first sub-pixel electrode; the second thin film transistor is connected to the gate line, the data line and the second sub-pixel electrode; the third thin film transistor is connected to the charge adjustment-control line, the first sub-pixel electrode and the common electrode line.

Optionally, the common electrode line includes a first common electrode line and a second common electrode line; the first common electrode line includes a first part in parallel with the gate line and a second part and a third part in parallel with the data line; the second common electrode line includes a fourth part in parallel with the gate line and a fifth part and a sixth part in parallel with the data line. The first part, the second part and the third part partially overlap the first sub-pixel electrode, to form a first storage capacitor; the fourth part, fifth part and sixth part partially overlap the second sub-pixel electrode, to form a second storage capacitor.

Optionally, the first sub-pixel electrode includes a first vein-like part, a second vein-like part and a plurality of first branch parts; each of the plurality of first branch parts is connected to the first vein-like part or the second vein-like part; the first vein-like part is in parallel with the gate line; the second vein-like part is in parallel with the data line; a slit is defined between adjacent two of the plurality of first branch parts; and the second sub-pixel electrode includes a third vein-like part, a fourth vein-like part and a plurality of second branch parts; wherein each of the plurality of second branch parts is connected to the third vein-like part or the fourth vein-like part; the third vein-like part is in parallel with the gate line; the fourth vein-like part is in parallel with the data line; and a slit is defined between adjacent two of the plurality of second branch parts.

Optionally, both of the first sub-pixel electrode and the second sub-pixel electrode are four-domain sub-pixel electrodes, and the first sub-pixel electrode and the second sub-pixel electrode are vertically arranged to realize eight-domain liquid crystal display.

Optionally, a width-to-length ratio of channel of the first thin film transistor is greater than a width-to-length ratio of channel of the third thin film transistor.

Optionally, a width-to-length ratio of channel of the first thin film transistor is equal to a width-to-length ratio of channel of the second thin film transistor.

Optionally, an area of the first sub-pixel electrode is larger than an area of the second sub-pixel electrode.

Optionally, a ratio of the area of the first sub-pixel electrode to the area of the second sub-pixel electrode is greater than 1 and less than or equal to 2.

A display device is further provided by the present disclosure, including: the above display substrate, a substrate opposite to the display substrate, and liquid crystals filled between the display substrate and the substrate opposite to the display substrate.

Optionally, the liquid crystal includes reactive mesogen.

A method for manufacturing the display panel is further provided by the present disclosure, including: S1: depositing a gate metal layer on the first base substrate, and patterning the gate metal layer to form a first gate electrode of the first thin film transistor, a second gate electrode of the second thin film transistor, a third gate electrode of the third thin film transistor, the gate line, the charge adjustment-control line, a first common electrode line and a second common electrode line; S2: depositing a gate insulating layer on the first base substrate formed after the step S1, and patterning the gate insulating layer to form a first via hole to expose the second common electrode line; S3: depositing a semiconductor layer on the first base substrate formed after the step S2, and patterning the semiconductor layer to form a first active layer of the first thin film transistor, a second active layer of the second thin film transistor and a third active layer of the third thin film transistor; S4: depositing a source-drain metal layer on the first base substrate formed after the step S3, and pattering the source-drain metal layer to form a first source electrode and a first drain electrode of the first thin film transistor, a second source electrode and a second drain electrode of the second thin film transistor, a third source electrode and a third drain electrode of the third thin film transistor and the data line; S5: depositing a passivation layer on the first base substrate formed after the step S4, and patterning the passivation layer to form a second via hole for exposing the first drain electrode, a third via hole for exposing the second drain electrode and a fourth via hole exposing the third source electrode; and S6: depositing a transparent conductive layer on the first base substrate formed after the step S5, and patterning the transparent conductive layer to from the first sub-pixel electrode and the second sub-pixel electrode.

The present disclosure has the following advantages.

According to the display panel and the method for manufacturing the same as well as the display device provided in the present disclosure, the charge adjustment-control line and the gate line are arranged between the first sub-pixel electrode and the second sub-pixel electrode; the first thin film transistor is connected to the gate line, the data line and the first sub-pixel electrode; the second thin film transistor is connected to the gate line, the data line and the second sub-pixel electrode, and the third thin film transistor is connected to the charge adjustment-control line, the first sub-pixel electrode and the common electrode line. Charging and charge adjustment of the storage capacitor in each sub-pixel electrode are controlled respectively by the gate line and the charge adjustment-control line, whereby the voltages of the first sub-pixel electrode and the second sub-pixel electrode may be adjusted, thereby the difference between the voltages of the first sub-pixel electrode and the second sub-pixel electrode may be adjusted and then the display device may obtain a better display view angle.

DETAILED DESCRIPTION

To make the technical scheme better understood by those skilled in the art, the display panel, the method for manufacturing the same and the display device may be described in details in conjunction with the drawings.

Figure 1:
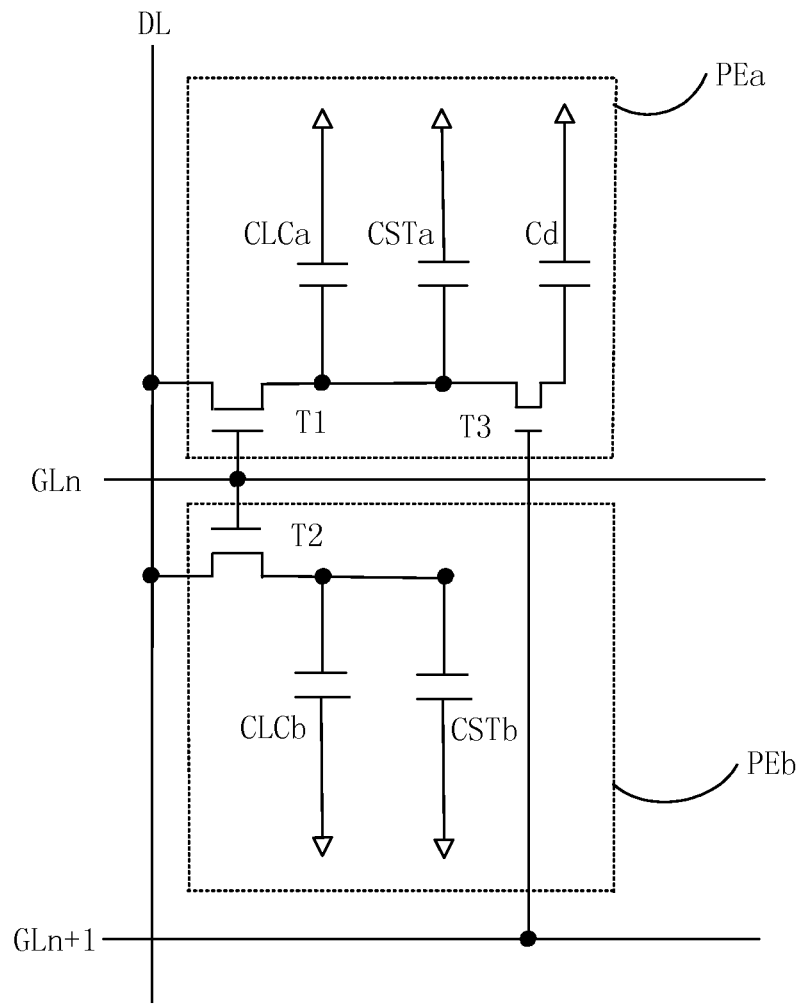
FIG. 1 is a schematic diagram showing a circuit of a liquid crystal display device according to the related art.
Figure 2:
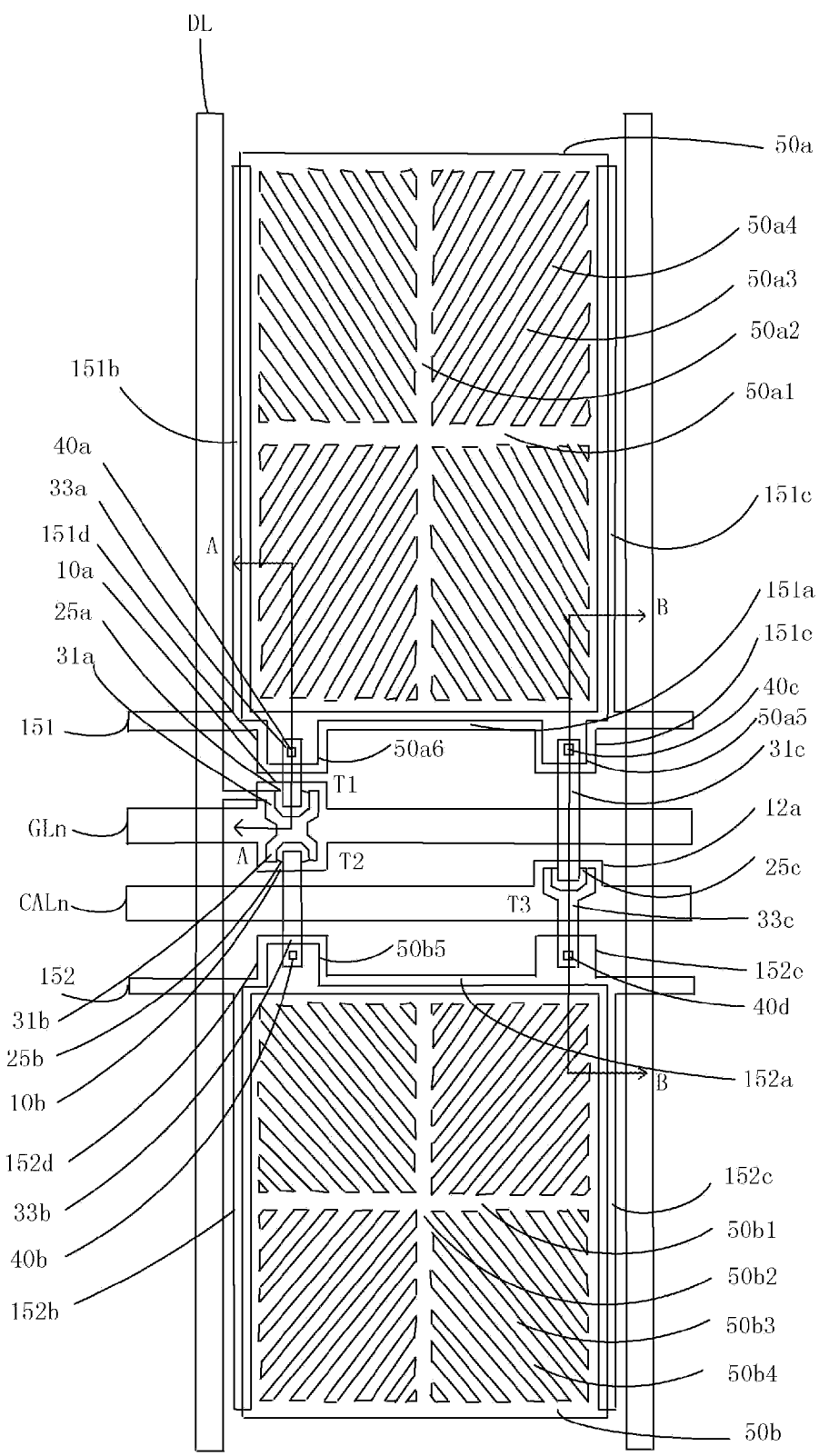
FIG. 2 is a schematic view showing a structure of a display substrate according to a first embodiment of the present disclosure.
Figure 3:
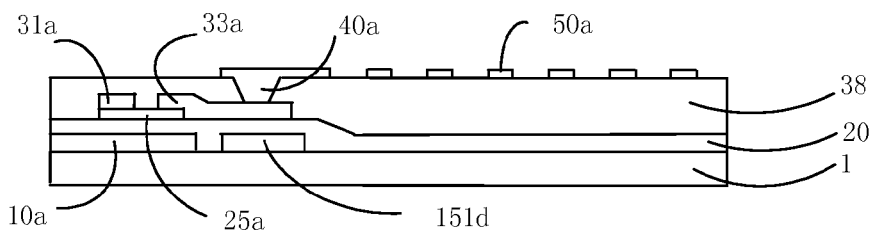
FIG. 3 is a sectional view of the display substrate taken along an arrow A-A in FIG. 2 according to the first embodiment of the present disclosure.
Figure 4:
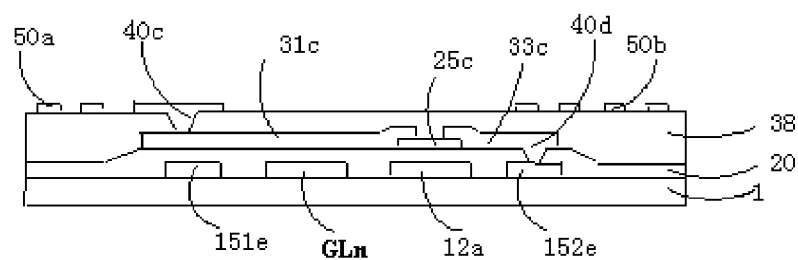
FIG. 4 is a sectional view of the display substrate taken along an arrow B-B in FIG. 2 according to the first embodiment of the present disclosure.

FIG. 2 is a schematic view showing a structure of a display substrate according to a first embodiment of the present disclosure; FIG. 3 is a sectional view of the display substrate taken along an arrow A-A in FIG. 2 according to the first embodiment of the present disclosure; FIG. 4 is a sectional view of the display substrate taken along an arrow B-B in FIG. 2 according to the first embodiment of the present disclosure. As shown in FIGS. 2-4, the display panel includes: a first base substrate 1; a gate line GLn, a data line DL and a common electrode line arranged on the first base substrate 1; a plurality of pixel units, where each of the plurality of pixel units includes a first sub-pixel electrode 50a, a second sub-pixel electrode 50b, a first thin film transistor T1, a second thin film transistor T2 and a third thin film transistor T3; and a charge adjustment-control line CALn, arranged on the first base substrate 1 and between the first sub-pixel electrode 50a and the second sub-pixel electrode 50b with the gate line GLn. The first thin film transistor T1 is connected to the gate line GLn, the data line DL and the first sub-pixel electrode 50a; the second thin film transistor T2 is connected to the gate line GLn, the data line DL and the second sub-pixel electrode 50b; the third thin film transistor T3 is connected to the charge adjustment-control line CALn, the first sub-pixel electrode 50a and the common electrode line.

Figure 5:
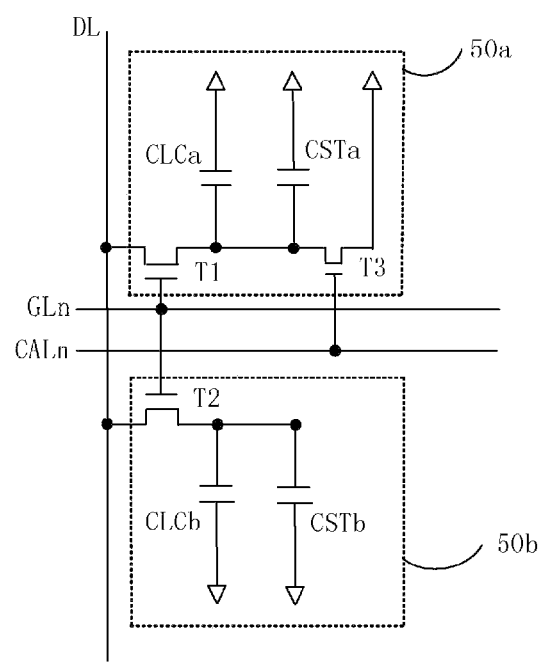
FIG. 5 is a schematic view showing an equivalent circuit of a display device adopting the display substrate in FIG. 2.

The common electrode line includes a first common electrode line 151 and a second common electrode line 152. The first common electrode line 151 includes a first part 151a in parallel with the gate line GLn and a second part 151b and a third part 151c in parallel with the data line DL. A first protrusion 151d and a second protrusion 151e are arranged on the first part 151a. The second common electrode line 152 includes a fourth part 152a in parallel with the gate line GLn and a fifth part 152b and a sixth part 152c in parallel with the data line DL. A third protrusion 152d and a fourth protrusion 152e are arranged on the fourth part 152a. The display substrate according to the first embodiment may be applied to a display device. FIG. 5 is a schematic view showing an equivalent circuit of a display device adopting the display substrate in FIG. 2. As shown in FIG. 5, a first storage capacitor CSTa is formed between the first sub-pixel electrode 50a and the first common electrode line 151, and a second storage capacitor CSTb is formed between the second sub-pixel electrode 50b and the second common electrode line 152. To be specific, the first part 151a, the second part 151b and the third part 151c partially overlap the first sub-pixel electrode 50a to form the first storage capacitor CSTa; the fourth part 152a, the fifth part 152b and the sixth part 152c partially overlap the second sub-pixel electrode 50b to form the second storage capacitor CSTb. A first liquid crystal capacitor CLCa is formed between the first sub-pixel electrode 50a and a common electrode of a substrate opposite to the display substrate; a second liquid crystal capacitor CLCb is formed between the second sub-pixel electrode 50b and the common electrode of the substrate opposite to the display substrate. The substrate opposite to the display substrate may be a color filter substrate.

The first sub-pixel electrode 50a includes a first vein-like part 50a1, a second vein-like part 50a2 and a plurality of first branch parts 50a3. Each of the plurality of first branch parts 50a3 is connected to the first vein-like part 50a1 or the second vein-like part 50a2; the first vein-like part 50a1 is in parallel with the gate line GLn; the second vein-like part 50a2 is in parallel with the data line DL; and a slit 50a4 is defined between adjacent two first branch parts 50a3. The second sub-pixel electrode 50b includes a third vein-like part 50b 1, a fourth vein-like part 50b2 and a plurality of second branch parts 50b3. Each of the plurality of second branch parts 50b3 is connected to the third vein-like part 50b1 or the fourth vein-like part 50b2; the third vein-like part 50b 1 is in parallel with the gate line GLn; the fourth vein-like part 50b2 is in parallel with the data line DL; and a slit 50b4 is defined between adjacent two second branch parts 50b3. Furthermore, the first sub-pixel electrode 50a further includes a fifth protrusion 50a5 and a sixth protrusion 50a6. The fifth protrusion 50a5 is opposite to the second protrusion 151e, and the sixth protrusion 50a6 is opposite to the first protrusion 151d. Furthermore, the second sub-pixel electrode 50b further includes a seventh protrusion 50b5. The seventh protrusion 50b5 is opposite to the third protrusion 152d. According to this embodiment, both of the first sub-pixel electrode 50a and the second sub-pixel electrode 50b are four-domain sub-pixel electrodes, thereby realizing an eight-domain liquid crystal display. To be specific, the first sub-pixel electrode 50a and the second sub-pixel electrode 50b are vertically arranged to realize the eight-domain liquid crystal display according to this embodiment.

The first thin film transistor T1 includes a first gate electrode 10a, a first active layer 25a, a first source electrode 31a and a first drain electrode 33a. The first gate electrode 10a is a protruding part of the gate line GLn and is integrally formed with the gate line GLn; the first source electrode 31a is connected to the data line DL; and the first drain electrode 33a is connected to the first sub-pixel electrode 50a. The second thin film transistor T2 includes a second gate electrode 10b, a second active layer 25b, a second source electrode 31b and a second drain electrode 33b. The second gate electrode 10b is a protruding part of the gate line GLn and is integrally formed with the gate line GLn; the second source electrode 31b is connected to the data line DL; and the second drain electrode 33b is connected to the second sub-pixel electrode 50b. The third thin film transistor T3 includes a third gate electrode 12a, a third active layer 25c, a third source electrode 31c and a third drain electrode 33c. The third gate electrode 12a is a protruding part of the charge adjustment-control line CALn and is integrally formed with the charge adjustment-control line CAL; the third source electrode 31c is connected to the first sub-pixel electrode 50a; and the third drain electrode 33c is connected to the second common electrode line 152.

According to this embodiment, the first gate electrode 10a, the second gate electrode 10b, the third gate electrode 12a, the gate line GLn, the charge adjustment-control line CALn, the first common electrode line 151 and the second common electrode line 152 are arranged in a same layer on the first base substrate 1. A gate insulating layer 20 is formed on the first gate electrode 10a, the second gate electrode 10b, the third gate electrode 12a, the gate line GLn, the charge adjustment-control line CALn, the first common electrode line 151 and the second common electrode line 152. A first via hole 40d is arranged in the gate insulating layer 20 to expose the second common electrode line 152. The first active layer 25a, the second active layer 25b and the third active layer 25c are on the gate insulating layer 20. The first source electrode 31a and the first drain electrode 33a are on the first active layer 25a, the second source electrode 31b and the second drain electrode 33b are on the second active layer 25b, the third source electrode 31c and the third drain electrode 33c are on the third active layer 25c, and a part of the third drain electrode 33c is located in the first via hole 40d, so as to realize a connection with the second common electrode line 152. The data line DL and the source and drain electrodes of each thin film transistor are arranged in a same layer. A passivation layer 38 is formed on the data line DL and the source and drain electrodes of each thin film transistor. Via holes 40a, 40b and 40c are arranged in the passivation layer 38; the via hole 40a exposes the first drain electrode 33a, the via hole 40b exposes the second drain electrode 33b, and the via hole 40c exposes the third source electrode 31c. The first sub-pixel electrode 50a and the second sub-pixel electrode 50b are on the passivation layer 38. A part of the first sub-pixel electrode 50a is located in the via hole 40a so as to realize a connection with the first drain electrode 33a; a part of the second sub-pixel electrode 50b is located in the via hole 40b so as to realize a connection with the second drain electrode 33b; and a part of the first sub-pixel electrode 50a is located in the via hole 40c so as to realize a connection with the third source electrode 31c.

Optionally, materials of the first gate electrode 10a, the second gate electrode 10b, the third gate electrode 12a, the gate line GLn, the charge adjustment-control line CALn, the first common electrode line 151 and the second common electrode line 152 may include metal materials such as Cu, Al, Mo, Ti, Cr or W, or an alloy of two or more of the above metal materials. The gate line GLn may be of a single-layer structure or a multi-layer structure. For example, the multi-layer structure may be Mo\Al\Mo, Ti\Cu\Ti or Mo\Ti\Cu.

Optionally, the material of the gate insulating layer 20 may include silicon nitride or silicon oxide. The gate insulating layer 20 may be of a single-layer structure or a multi-layer structure. For example, the multi-layer structure may be silicon oxide/silicon nitride.

Optionally, the first active layer 25a, the second active layer 25b and the third active layer 25c may include A-Si, poly-Si, microcrystalline Si or oxide semiconductor.

Optionally, the material of the passivation layer 38 may be an inorganic substance, e.g., silicon nitride.

Optionally, the materials of the first sub-pixel electrode 50a and the second sub-pixel electrode 50b may include ITO, IZO or other transparent metallic oxide conductive materials.

According to this embodiment, a width-to-length ratio of channel of the first thin film transistor T1 is greater than a width-to-length ratio of channel of the third thin film transistor T3.

According to this embodiment, the width-to-length ratio of channel of the first thin film transistor T1 is equal to a width-to-length ratio of channel of the second thin film transistor T2.

According to this embodiment, an area of the first sub-pixel electrode 50a is larger than an area of the second sub-pixel electrode 50b. Optionally, a ratio of the area of the first sub-pixel electrode 50a to the area of the second sub-pixel electrode 50b is greater than 1 and less than or equal to 2.

Figure 6:
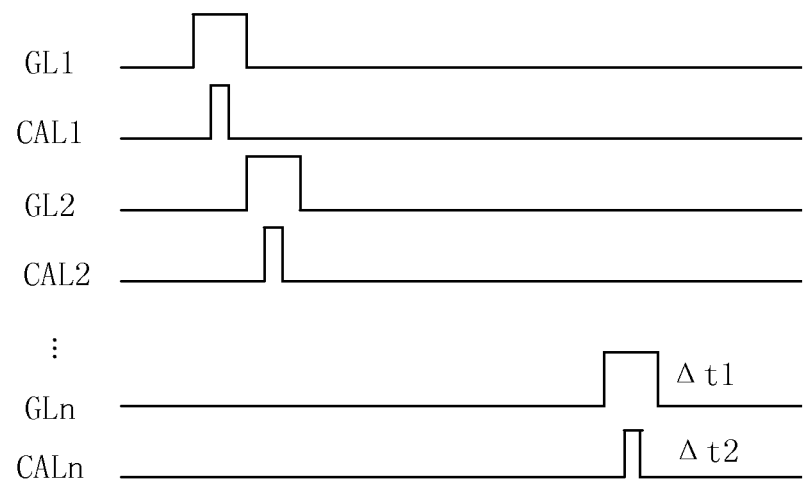
FIG. 6 is a schematic view showing a time sequence of the display device adopting the display substrate in FIG. 2.

FIG. 6 is a schematic view showing a time sequence of the display device adopting the display substrate in FIG. 2. As shown in FIG. 5 and FIG. 6, during $\Delta$ t1 when a level of the gate line GLn is a high level, the first thin film transistor T1 is turned on, and a data voltage Vdata of the data line DL charges the first storage capacitor CSTa via the first film transistor T1. The second thin film transistor T2 is turned on, the data voltage Vdata of the data line DL charges the second storage capacitor CSTb via the second thin film transistor T2. During $\Delta$ t2 when a level of the charge adjustment-control line CALn is a high level, the third thin film transistor T3 is turned on, and a part of a current for charging the first storage capacitor CSTa may be branched, thereby charges Qb in the second storage capacitor CSTb is more than charges Qa in the first storage capacitor CSTa, i.e., there exists a difference between Qa and Qb. The difference between Qa and Qb may be adjusted by adjusting length of $\Delta$ t2, whereby a difference between a voltage Vb of the second sub-pixel electrode 50b and a voltage Va of the first sub-pixel electrode 50a may be adjusted. It should be noted that, a capacitance of the first liquid crystal capacitor CLCa is much smaller than that of the first storage capacitor CSTa, and a capacitance of the second liquid crystal capacitor CLCb is much smaller than that of the second storage capacitor CSTb, therefore effects of the first liquid crystal capacitor CLCa and the second liquid crystal capacitor CLCb are not involved in analyzing the difference between the Vb and the Va. To sum up, the difference between the Vb and the Va is adjustable.

A method for manufacturing the display substrate may be described in details with an example. The method includes following steps.

Step 101: depositing a gate metal layer on the first base substrate 1, and patterning the gate metal layer to form a first gate electrode 10a of the first thin film transistor T1, a second gate electrode 10b of the second thin film transistor T2, a third gate electrode 12a of the third thin film transistor T3, the gate line GLn, the charge adjustment-control line CALn, a first common electrode line 151 and a second common electrode line 152.

To be specific, the gate metal layer may be deposited on the first base substrate 1 by a magnetron sputtering process.

Step 102: depositing a gate insulating layer 20 on the first base substrate 1 formed after Step 101, and patterning the gate insulating layer 20 to form a first via hole 40d to expose the second common electrode line 152.

Step 103: depositing a semiconductor layer on the first base substrate 1 formed after Step 102, and patterning the semiconductor layer to form a first active layer 25a of the first thin film transistor T1, a second active layer 25b of the second thin film transistor T2 and a third active layer 25c of the third thin film transistor T3.

To be specific, an a-Si and an n+a-Si semiconductor layers may be continuously deposited by a plasma enhanced chemical vapor deposition (PECVD) process, or a semiconductor layer IGZO may be deposited by the magnetron sputtering process.

Step 104: depositing a source-drain metal layer on the first base substrate 1 formed after Step 103, and patterning the source-drain metal layer to form a first source electrode 31a and a first drain electrode 33a of the first thin film transistor T1, a second source electrode 31b and a second drain electrode 33b of the second thin film transistor T2, a third source electrode 31c and a third drain electrode 33c of the third thin film transistor T3 and the data line DL.

To be specific, the source-drain metal layer may be deposited by the magnetron sputtering process.

Step 105: depositing a passivation layer 38 on the first base substrate 1 formed after Step 104, and patterning the passivation layer 38 to form a via hole 40a for exposing the first drain electrode 33a, a via hole 40b for exposing the second drain electrode 33b and a via hole 40c for exposing the third source electrode 31c.

To be specific, the passivation layer 38 may be deposited by a PECVD process.

Step 106: depositing a transparent conductive layer on the first base substrate 1 formed after Step 105, and patterning the transparent conductive layer to from the first sub-pixel electrode 50a and the second sub-pixel electrode 50b.

A part of the first sub-pixel electrode 50a is located in the via hole 40a so as to realize a connection with the first drain electrode 33a, a part of the second sub-pixel electrode 50b is located in the via hole 40b so as to realize a connection with the second drain electrode 33b, and a part of the first sub-pixel electrode 50a is located in the via hole 40c so as to realize a connection with the third source electrode 31c.

To be specific, the transparent conductive layer may be deposited by the magnetron sputtering process.

According to this embodiment, the patterning process may include photoresist coating, exposing, developing, etching, photoresist lifting off, etc.

According to the display panel and the method for manufacturing the same in this embodiment, the charge adjustment-control line and the gate line are arranged between the first sub-pixel electrode and the second sub-pixel electrode; the first thin film transistor is connected to the gate line, the data line and the first sub-pixel electrode; the second thin film transistor is connected to the gate line, the data line and the second sub-pixel electrode, and the third thin film transistor is connected to the charge adjustment-control line, the first sub-pixel electrode and the common electrode line. According to this embodiment, charging and charge adjustment of the storage capacitor in each sub-pixel electrode are controlled respectively by the gate line and the charge adjustment-control line, whereby the voltages of the first sub-pixel electrode and the second sub-pixel electrode may be adjusted, thereby the difference between the voltages of the first sub-pixel electrode and the second sub-pixel electrode may be adjusted and then the display device may obtain a better display view angle.

Figure 7:
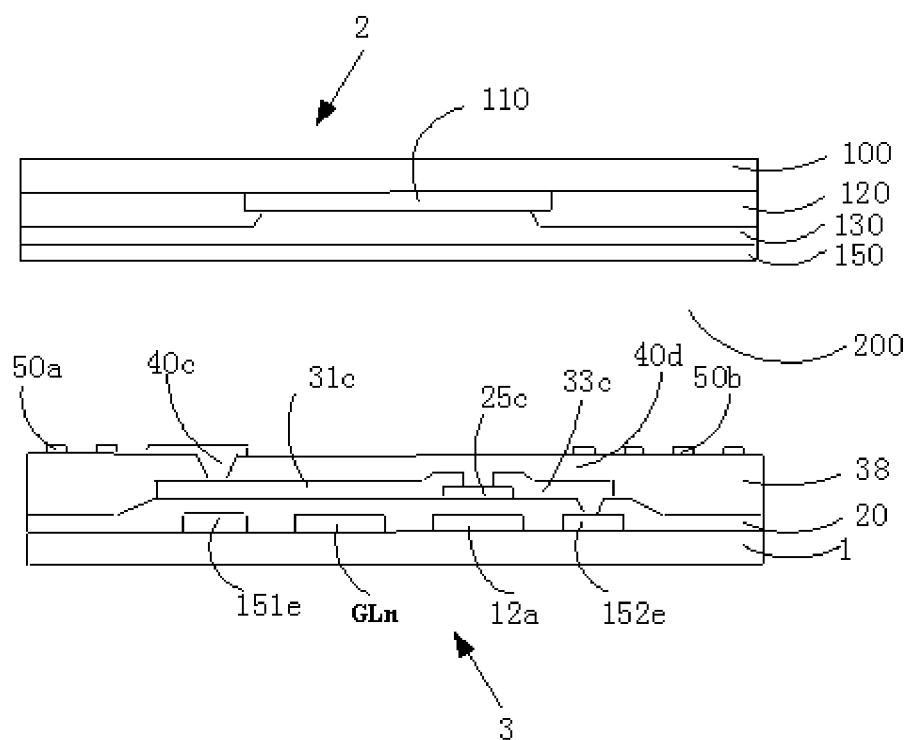
FIG. 7 is a schematic view showing a display device according to a second embodiment of the present disclosure.

FIG. 7 is a schematic view showing a display device according to a second embodiment of the present disclosure. As shown in FIG. 7, the display device includes a display substrate 3, a substrate 2 opposite to the display substrate 3, and liquid crystals 200 filled between the display substrate 3 and the substrate 2.

According to this embodiment, the display substrate 3 may be the display substrate according to the first embodiment, and the description thereof is omitted herein. The display substrate may be an array substrate.

According to this embodiment, the opposite substrate 2 may be a color filter substrate. In this case, the substrate 2 may include a second base substrate 100, a black matrix 110 and a color filter layer 120 on the second base substrate 100. The black matrix 110 is in the color filter layer 120. A flat layer 130 is formed on the black matrix 110 and the color filter layer 120; and a common electrode 150 is formed on the flat layer 130. In practical application, the opposite substrate 2 may also be a color filter substrate of other structures, and the description thereof is omitted herein.

According to this embodiment, the liquid crystals 200 may include light-reactive substance. The light-reactive substance may be reactive mesogen (RM) which may occur polymerization reaction when being irradiated with ultraviolet light, so as to make liquid crystals obtain a specific pre-tilt angle.

According to the display device in this embodiment, the charge adjustment-control line and the gate line are arranged between the first sub-pixel electrode and the second sub-pixel electrode; the first thin film transistor is connected to the gate line, the data line and the first sub-pixel electrode; the second thin film transistor is connected to the gate line, the data line and the second sub-pixel electrode, and the third thin film transistor is connected to the charge adjustment-control line, the first sub-pixel electrode and the common electrode line. According to this embodiment, charging and charge adjustment of the storage capacitor in each sub-pixel electrode are controlled respectively by the gate line and the charge adjustment control-line, whereby the voltages of the first sub-pixel electrode and the second sub-pixel electrode may be adjusted, thereby the difference between the voltages of the first sub-pixel electrode and the second sub-pixel electrode may be adjusted and then the display device may obtain a better display view angle.

It may be understood that, the above embodiments are merely the exemplary embodiments for illustrating a principle of the present disclosure, but the present disclosure is not limited thereto. Those skilled in the art may make various modifications and improvements without departing from the spirit and essence of the present disclosure, and these modifications and improvements may also fall into the scope of the present disclosure.

What is claimed is:

1. A display substrate comprising:
   a first base substrate;
   a gate line, a data line and a common electrode line arranged on the first base substrate;
   a plurality of pixel units; wherein each of the plurality of pixel units comprises a first sub-pixel electrode, a second sub-pixel electrode, a first thin film transistor, a second thin film transistor and a third thin film transistor; and
   a charge adjustment-control line arranged on the first base substrate; wherein the charge adjustment-control line and the gate line are arranged between the first sub-pixel electrode and the second sub-pixel electrode;
   wherein the first thin film transistor is connected to the gate line, the data line and the first sub-pixel electrode; the second thin film transistor is connected to the gate line, the data line and the second sub-pixel electrode; the third thin film transistor is connected to the charge adjustment-control line, the first sub-pixel electrode and the common electrode line.

2. The display substrate according to claim 1, wherein the common electrode line comprises a first common electrode line and a second common electrode line; the first common electrode line comprises a first part in parallel with the gate line, and a second part and a third part in parallel with the data line; the second common electrode line comprises a fourth part in parallel with the gate line, and a fifth part and a sixth part in parallel with the data line; and
   wherein the first part, the second part and the third part partially overlap the first sub-pixel electrode, to form a first storage capacitor; the fourth part, fifth part and sixth part partially overlap the second sub-pixel electrode, to form a second storage capacitor.

3. The display substrate according to claim 1, wherein the first sub-pixel electrode comprises a first vein-like part, a second vein-like part and a plurality of first branch parts; each of the plurality of first branch parts is connected to the first vein- like part or the second vein-like part; the first vein-like part is in parallel with the gate line; the second vein-like part is in parallel with the data line; a slit is defined between adjacent two of the plurality of first branch parts; and
   the second sub-pixel electrode comprises a third vein-like part, a fourth vein-like part and a plurality of second branch parts; wherein each of the plurality of second branch parts is connected to the third vein-like part or the fourth vein-like part; the third vein-like part is in parallel with the gate line; the fourth vein-like part is in parallel with the data line; and a slit is defined between adjacent two of the plurality of second branch parts.

4. The display substrate according to claim 1, wherein both of the first sub-pixel electrode and the second sub-pixel electrode are four-domain sub-pixel electrodes, and the first sub-pixel electrode and the second sub-pixel electrode are vertically arranged to realize eight-domain liquid crystal display.

5. The display substrate according to claim 1, wherein a width-to-length ratio of channel of the first thin film transistor is greater than a width-to-length ratio of channel of the third thin film transistor.

6. The display substrate according to claim 1, wherein a width-to-length ratio of channel of the first thin film transistor is equal to a width-to-length ratio of channel of the second thin film transistor.

7. The display substrate according to claim 1, wherein an area of the first sub-pixel electrode is larger than an area of the second sub-pixel electrode.

8. The display substrate according to claim 7, wherein a ratio of the area of the first sub-pixel electrode to the area of the second sub-pixel electrode is greater than 1 and less than or equal to 2.

9. A method for manufacturing the display substrate according to claim 8, comprising:
   S1: depositing a gate metal layer on the first base substrate, and patterning the gate metal layer to form a first gate electrode of the first thin film transistor, a second gate electrode of the second thin film transistor, a third gate electrode of the third thin film transistor, the gate line, the charge adjustment-control line, a first common electrode line and a second common electrode line;
   S2: depositing a gate insulating layer on the first base substrate formed after the step S1, and patterning the gate insulating layer to form a first via hole to expose the second common electrode line;
   S3: depositing a semiconductor layer on the first base substrate formed after the step S2, and patterning the semiconductor layer to form a first active layer of the first thin film transistor, a second active layer of the second thin film transistor and a third active layer of the third thin film transistor;

S4: depositing a source-drain metal layer on the first base substrate formed after the step S3, and patterning the source-drain metal layer to form a first source electrode and a first drain electrode of the first thin film transistor, a second source electrode and a second drain electrode of the second thin film transistor, a third source electrode and a third drain electrode of the third thin film transistor and the data line;

S5: depositing a passivation layer on the first base substrate formed after the step S4, and patterning the passivation layer to form a second via hole for exposing the first drain electrode, a third via hole for exposing the second drain electrode and a fourth via hole exposing the third source electrode; and S6: depositing a transparent conductive layer on the first base substrate formed after the step S5, and patterning the transparent conductive layer to from the first sub-pixel electrode and the second sub-pixel electrode.

10. A display device, comprising the display substrate according to claim 1, a substrate opposite to the display substrate, and liquid crystals filled between the display substrate and the substrate opposite to the display substrate.

11. The display device according to claim 10, wherein the liquid crystal comprises reactive mesogen.

\* \* \* \* \*